US009736441B2

(12) United States Patent
Morichika

(10) Patent No.: US 9,736,441 B2
(45) Date of Patent: Aug. 15, 2017

(54) DISPLAY IMAGE GENERATING DEVICE COMPRISING CONVERTING FUNCTION OF RESOLUTION

(75) Inventor: Kazumasa Morichika, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 2725 days.

(21) Appl. No.: 10/964,427

(22) Filed: Oct. 13, 2004

(65) Prior Publication Data

US 2005/0078052 A1    Apr. 14, 2005

(30) Foreign Application Priority Data

Oct. 14, 2003  (JP) .................................. 2003-353621

(51) Int. Cl.
G09G 5/00     (2006.01)
H04N 9/31     (2006.01)
H04N 5/262    (2006.01)

(52) U.S. Cl.
CPC ......... *H04N 9/3188* (2013.01); *H04N 5/2628* (2013.01)

(58) Field of Classification Search
CPC .......................... H04N 9/3188; H04H 5/2028
USPC .................................................. 345/7–9, 204
See application file for complete search history.

(56) References Cited

U.S. PATENT DOCUMENTS 5,721,565 A *  2/1998  Nguyen .................... 345/660
5,790,124 A *  8/1998  Fischer et al. ............. 345/629
6,509,915 B2 *  1/2003  Berman et al. ............. 715/840
6,593,938 B1 *  7/2003  Sakata et al. .............. 345/629
6,654,507 B2 * 11/2003  Luo ............................. 382/282
6,992,672 B1 *  1/2006  Niikawa et al. ............ 345/530
2003/0020885 A1 *  1/2003  Suzuki ........................ 353/71

FOREIGN PATENT DOCUMENTS

JP  11-088806       3/1999
JP  2000-339130 A  12/2000
JP  2001-109422  *  4/2001
JP  2001-119570 A   4/2001
JP  2001-223934 A   8/2001
WO  WO 01/09836 A1 * 2/2001

OTHER PUBLICATIONS

European Search Report dated Dec. 19, 2008 issues in counterpart EP Appln. No. EP 04 02 4404.
Japanese Office Action dated Feb. 10, 2009 (2 pages), and English translation thereof (2 pages) issued in counterpart Japanese Application No. 2003-353621.
Chinese Office Action (and English translation thereof) dated Jan. 25, 2008, issued in a counterpart Chinese Application.

* cited by examiner

*Primary Examiner* — William Boddie
*Assistant Examiner* — Leonid Shapiro
(74) *Attorney, Agent, or Firm* — Holtz, Holtz & Volek PC

(57) ABSTRACT

A high resolution photographed image, picked up by a camera device, is projected by using a projector. In a case where there is a magnifying operation of a display image that is projected, image data of the display image that is reduced in accordance with the resolution at the projector side, is not magnified, but the image data of a display region corresponding to the size of a requested magnification ratio in the original photographed image, is reduced, to project a magnified image that is a display image based on the image data.

2 Claims, 11 Drawing Sheets

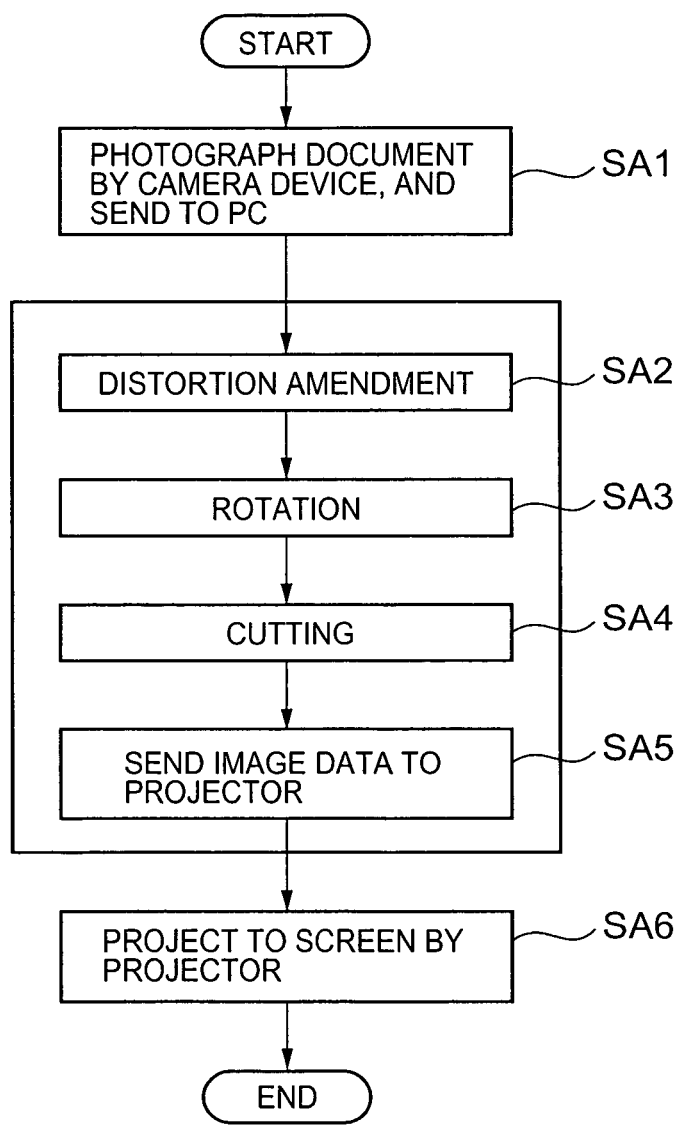

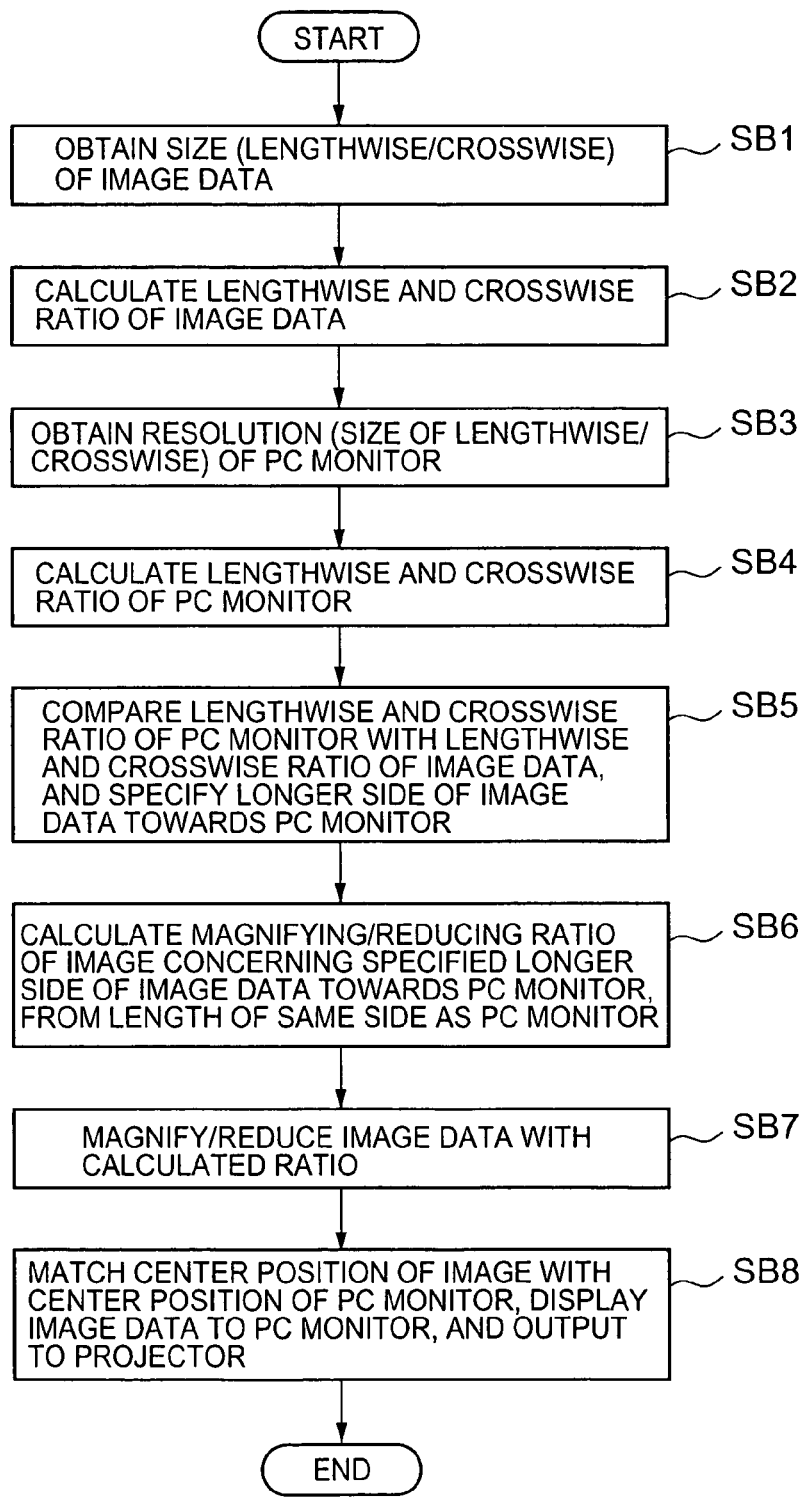

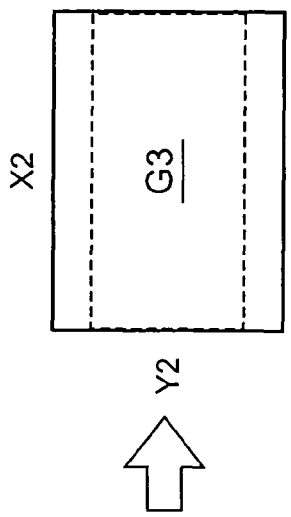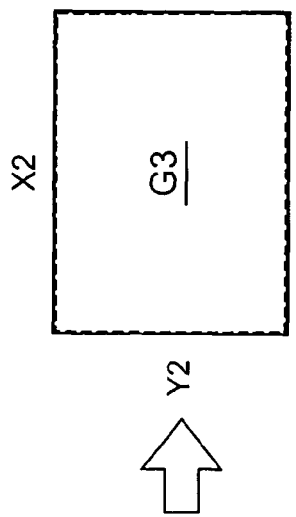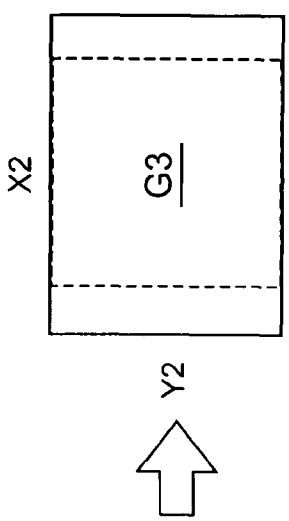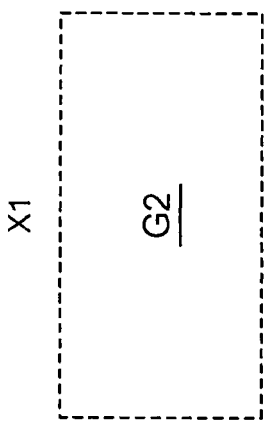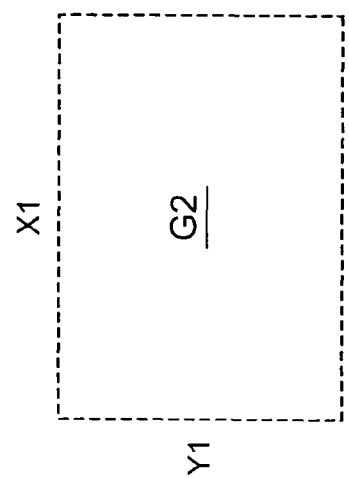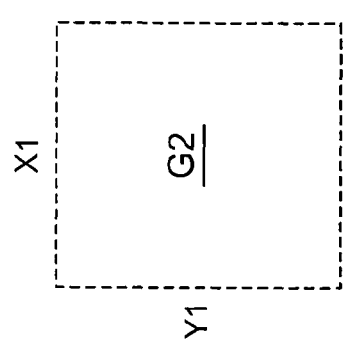
FIG. 9A  FIG. 9B  FIG. 9C

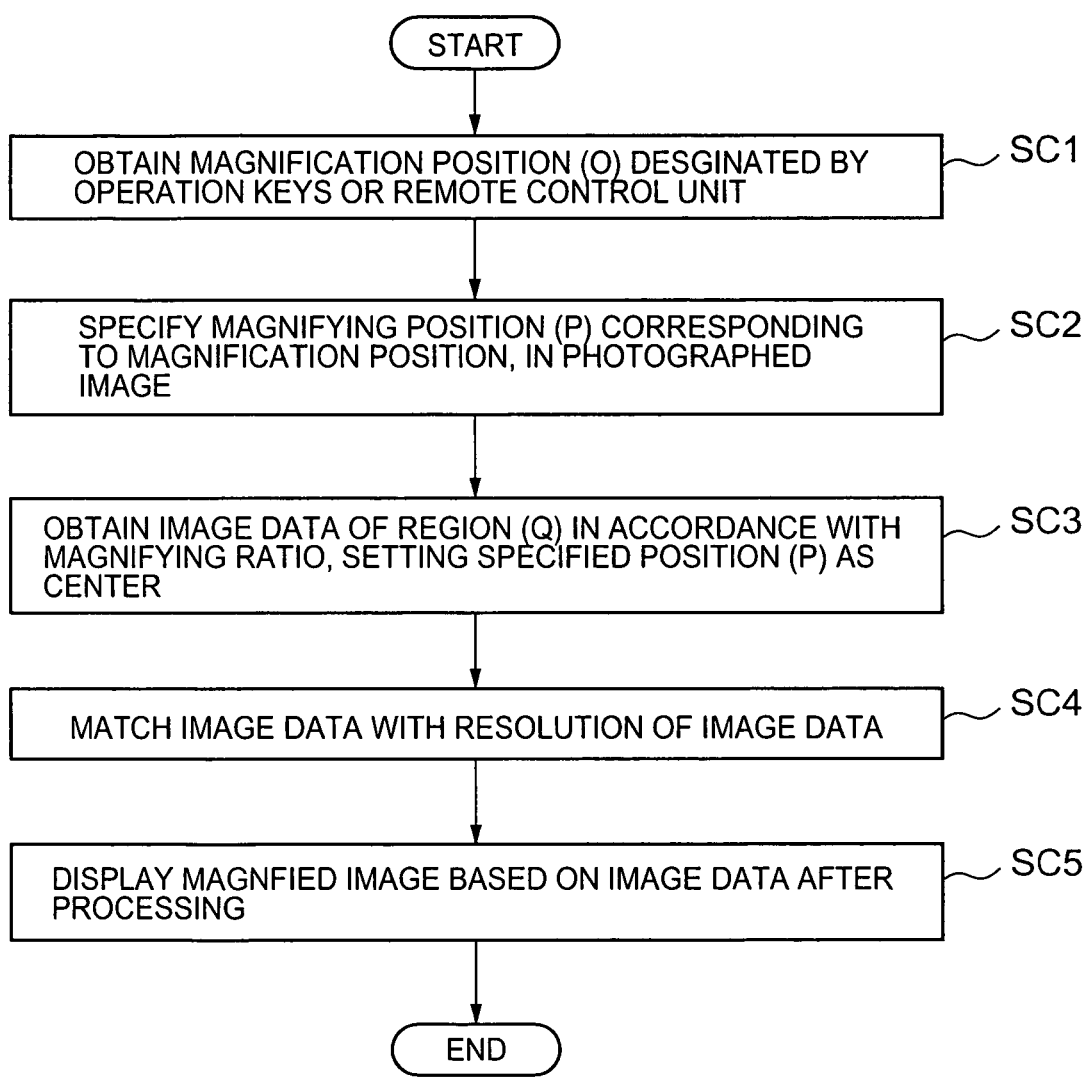

DISPLAY IMAGE GENERATING DEVICE COMPRISING CONVERTING FUNCTION OF RESOLUTION

BACKGROUND OF THE INVENTION

Field of the Invention

The present invention relates to a display image generating device having a converting function of image resolution.

Description of the Related Art

In recent years, magnifying projection of images of documents (characters and charts, etc.) created by a personal computer (hereinafter referred to as PC) to a screen, using a projector, is carried out during a presentation, or a meeting, etc. The projector comprises a structure of converting an image signal input from the PC, etc., as an image signal, to a projection light by an image converting element such as a liquid crystal panel or micro mirror array, etc. There are projectors that comprise magnification display functions (hereinafter referred to as digital zoom function) that magnify and project images sent from the PC, etc., by carrying out data processing.

As a device for projecting for example, document references (newspapers, articles in magazines, or hand-written manuscripts), etc., or a three dimensional reference or object, a document camera is used. The document camera has a structure of transferring the image data generally photographed (imaged) by a CCD or MOS type imaging element to the projector via the PC, or directly to the projector.

In a case where the above described document camera is used, when an arbitrary region is requested to be projected by magnifying the region, a method of nearing the document camera to the document reference, etc., raising a zoom ratio if the document camera has an optical zoom, or a method of utilizing the above described magnification display function of the projector, is used. In that case of nearing the document camera to the document reference, an operation of matching the imaging region of the document camera with the to-be-displayed part of the document reference, etc. is carried out. This operation is burden for the user. Therefore, in most cases where a projector having a digital zoom function is used, the method using that function is adopted.

However, in a case where the digital zoom function that the projector has is used, there are problems such as below. The resolution of the image that the projector can project, differs according to the model, but is generally SVGA (800×600 pixels) to SXGA (1,024×1,024 pixels), and for example, in a case where an image data is sent from a PC to a projector, a processing of matching the resolution of the image to the resolution of the image that the projector can project, is carried out in advance.

Therefore, in a case where an arbitrary region of an image is projected magnified by the above described digital zoom function, the resolution of the magnified image reduces being proportional to the magnifying ratio. For example, in a case where the projector projects an image of SVGA and a magnification ratio of 1.25 times at SVGA, an image data of 800×600 pixels is generated by carrying out pixel interpolation on an image of 640×480 pixels. Especially in a case where an arbitrary region of an image of document reference, etc., imaged by a document camera is magnified, because the image is a natural image, the image quality after magnification drops remarkably.

SUMMARY OF THE INVENTION

The present invention has been made in consideration of the above problem.

According to a first aspect of the present invention, an image pick-up and projection device comprises:

imaging means for imaging an object and generating image data;

image converting means for converting image data a predetermined resolution to a projection light to be projected on a screen;

generating means for generating the image data having the predetermined resolution from the image data obtained by the imaging means, wherein the image data having the predetermined resolution is convertible to the projection light by the image converting means; and magnification control means for responding to a magnification request of a display image and controlling the generating means to generate the image data such that the image data: (i) has the predetermined resolution, (ii) represents an image which is a part of the image represented by the image data obtained by the imaging means and which has a size corresponding to the magnification in the display image, and (iii) is obtained by reducing a size of the image of the object obtained by the imaging means, where a resolution of the imaging means exceeds a resolution that the image conversion means can convert, and where, when magnifying a part of the display image for projection thereof, image data in a display region, whose size corresponds to a requested magnification ratio for the display image, is adjusted to a resolution of a projection region of the image converting means without magnifying original image data of the object image that is original, and then a magnified image based on the adjusted image data is projected.

BRIEF DESCRIPTION OF THE DRAWINGS

These objects and other objects and advantages of the present invention will become more apparent upon reading of the following detailed description and the accompanying drawings in which:

FIG. 5 is a flowchart showing basic operation of the photographed image projection system;

FIG. 7 is a flowchart showing operation content concerning display and output of an image, by the PC;

FIGS. 9A to 9C are diagrams showing the relation of photographed image after the cutting processing and the display screen of the PC monitor and the projection image;

FIG. 10 is a flowchart showing movement content concerning magnifying processing of an image by the PC.

DETAILED DESCRIPTION OF THE PREFERRED EMBODIMENT

Figure 1:
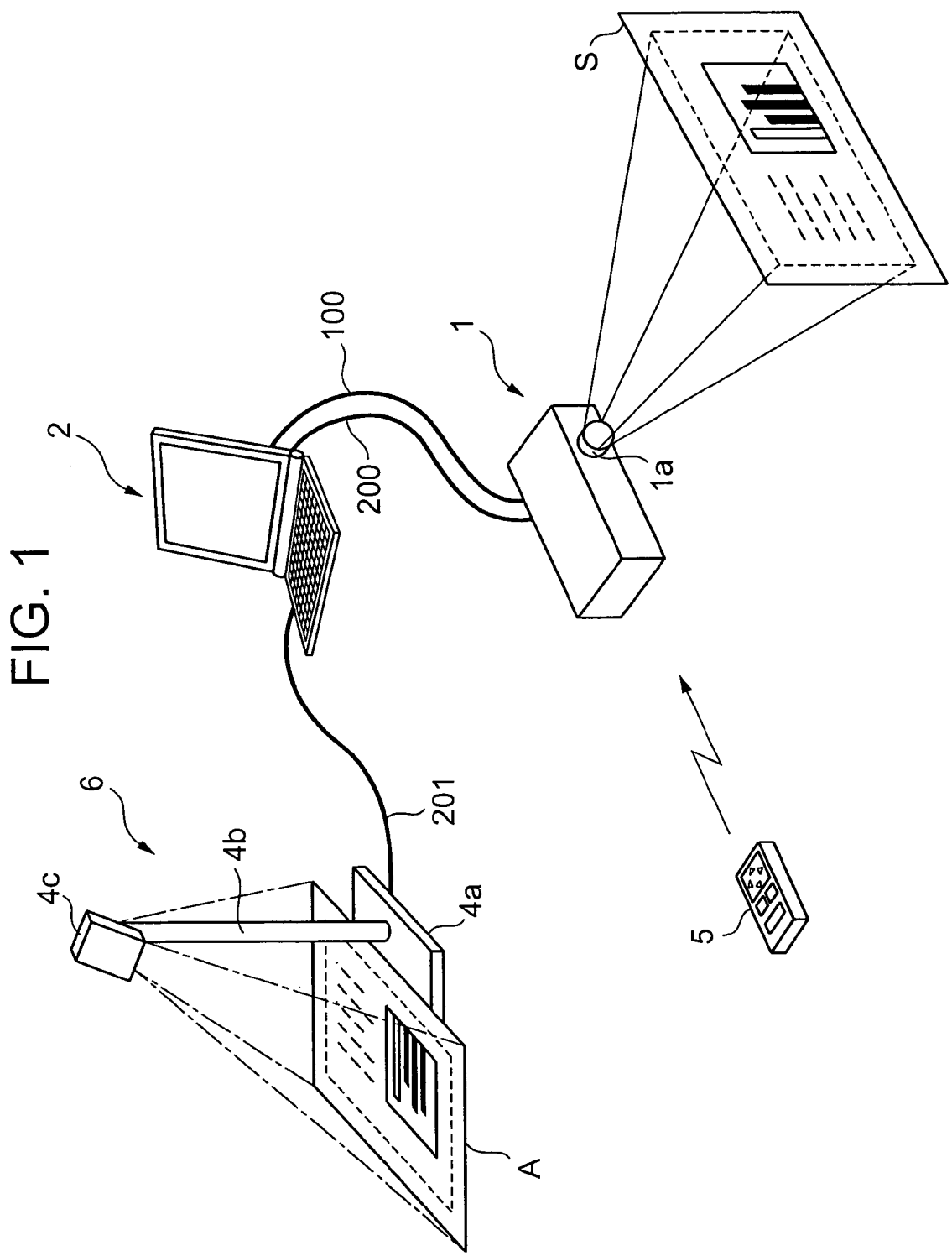
FIG. 1 is a system structure diagram showing a photographed image projection system according to the present invention.

A picked-up photographed) image projection system according to an embodiment of the present invention comprises a projector 1, a laptop personal computer (hereinafter referred to as PC) 2, and a camera device 4. The projector 1 and the PC 2 are connected with each other via a RGB cable 100 and a USB cable 200. The PC2 and the camera device 4 are connected with each other via another USB cable 201. Each device is connected to the cables via a connector, in accordance with need. In the present embodiment, the PC 2 serves as a display image generating device of the present invention.

The projector 1 is provided at the front end portion of the main body. The projector 1 has an optical system such as a projection lens, etc., and projects a light corresponding to an image such as a document, etc., sent from the PC 2, to a screen S (or a white board, etc.) from the projection unit 1a. The projector 1 has a remote control unit 5. The remote control unit 5 send commands and data to the projector 1 through the infrared light. Operation of the projector 1 from a distant place, becomes possible by the infrared remote control unit 5.

The camera device (document camera) 4 comprises: a camera base 4a; a strut 4b provided on the camera base 4a; and a digital camera 4c that is attached to an attaching unit which is provided at an upper end portion of the strut 4b and supports the camera 4c so that it can rotate up and down and right to left. The digital camera 4c has a general specification including AE (Auto Exposure) function, etc., and a predetermined photographing (imaging) mode that includes PC camera function for outputting image data obtained by photographing (picking-up image; or imaging).

Arbitrary document material A, such as articles of newspapers or magazines, presentation documents, and document manuscripts, etc., or various three-dimension materials are placed on the camera base 4a.

The camera 4c imaging (photographing) the material A, and sends (outputs) the photographed (picked-up) image (more specifically, image data representing picked-up image) to the projector 1 via the PC 2, and the projector 1 projects, the image of the document A̲, etc., defined by the supplied image data, on a screen S.
(Structure of the Projector)

Figure 2:
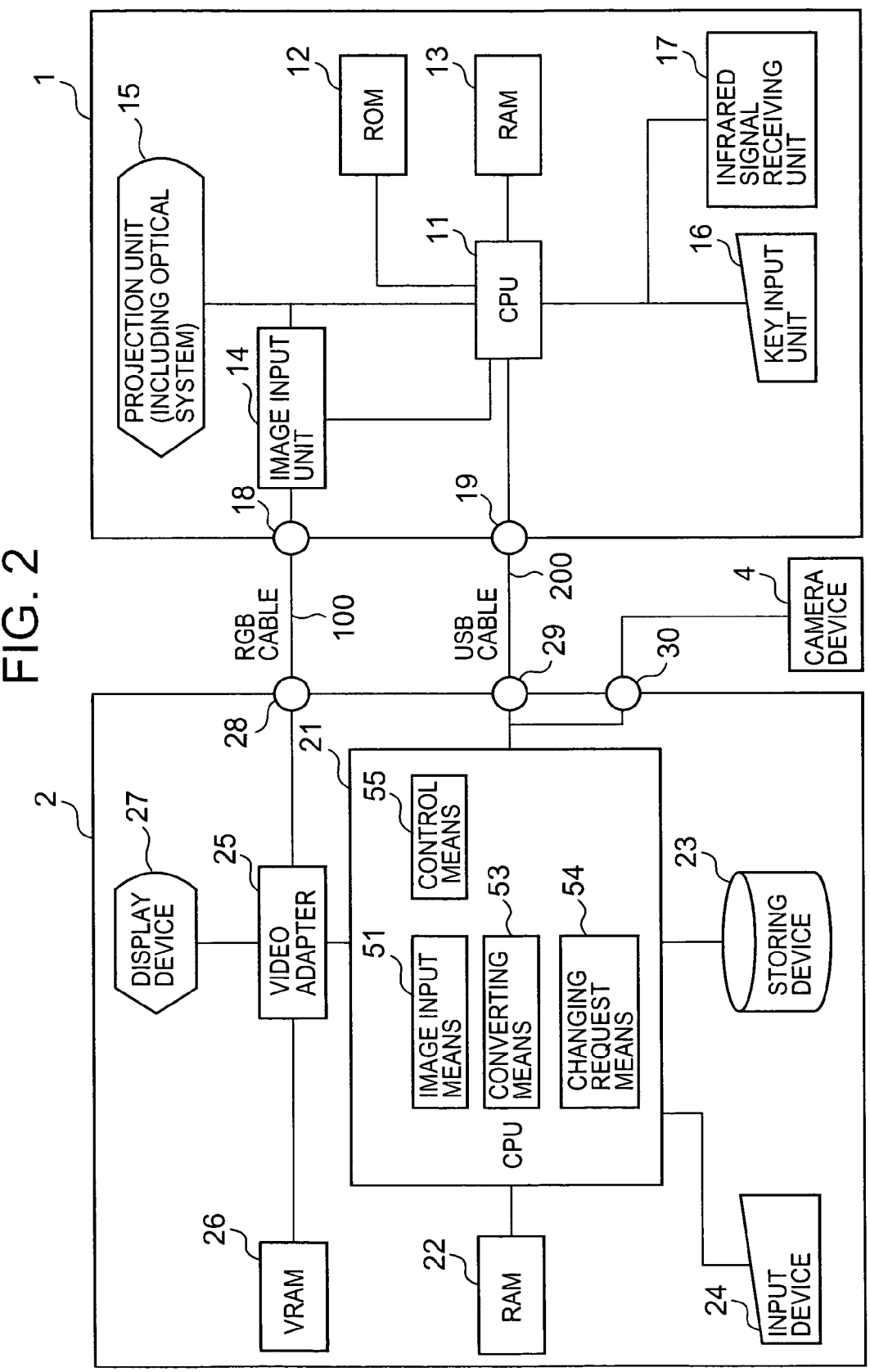
FIG. 2 is a block diagram showing an outline of an electric structure of mainly a projector and a PC in the photographed image projection system.

FIG. 2 is a block diagram mainly showing an electronic structure of the projector 1 and the PC 2 in the above image projection system. The projector 1 comprises a CPU (Central Processing Unit) 11, a ROM (Read Only Memory) 12, a RAM (Random Access Memory) 13, an image input unit 14, a display unit 15, a key input unit 16, and an infrared signal receiving unit 17.

An input terminal 18 of an RBG signals that has the RGB cable 100 connected thereto, is connected to the image input unit 14. The image input unit 14 receives the RGB signals and generates a display signal for displaying and projecting an image based on the RGB signals (image input signals) and supplies the display signal to the display unit 15. The display unit 15 includes a light source such as a krypton lamp, etc.; image conversion elements (serve as projection means of the present invention), such as a liquid crystal panel and micro mirror array, etc., for converting light from the light source to a projection light corresponding to the display signal; a drive circuit for driving the image conversion elements, based on the display signal sent from the image input unit 14; and an optical system such as a projection lens, etc., provided at the projection unit 1a, and projects a display image based on the image data sent from the PC 2 to the screen S.

The CPU 11 operates the RAM 13 as a work area, in accordance with a program stored in the ROM 12, to control the entire projector 1. The key input unit 16 comprises a plurality of operation (operable) keys prepared for the user to operate the projector 1. The infrared signal receiving unit 17 receives infrared light sent from the remote control unit 5, decodes the operation signal that includes coded information, and sends the decoded signal to the CPU 11. A USB interface circuit (not shown) is connected to the CPU 11. A USB terminal 19 that has the USB cable 200 connected thereto, is provided on the USB interface circuit. In the present embodiment, operation signals sent from the operation keys of the key input unit 16, and the infrared remote control unit 5, are sent to the PC 2, in accordance with need.
(Structure of PC)

The PC 2 comprises a CPU 21, a RAM 22, a storing device 23, an input device 24, a video adapter 25, a VRAM 26, and a display device 27. The PC 2 comprises two USB ports. A first USB connection terminal 29, and a second USB connection terminal 30, are provided at a not shown USB Interface circuit connected to the USB ports of the CPU 21. The USB cable 200 is connected to the first USB connection terminal 29, and another USB cable 201 is connected to the second USB connection terminal 30.

The video adapter 25 generates a video signal (RGB signals) for display, and outputs the video signal to the display device 27 that comprises an LCD panel and a drive circuit, etc., thereof. The VRAM 26 continually stores the image data for display, that the video adapter 25 generates. An RGB output terminal 28 that has the RGB cable 100 connected thereto, is provided at the video adapter 25. The video adapter 25 has a function for outputting image data for displaying an image to be projected on the screen S, which is generated other than the image data that is output to the display device 27 in accordance with instructions from the PC 21, to the projector 1, via the RGB cable 100.

The input device 24 includes a plurality of keys provided at the main body of the PC 2, and a mouse, etc., connected to the main body, and the storing device 23 is a hard disk, etc., with a relatively large storing capacity. The storing devices stores a predetermined presentation program for generating and editing documents for presentations, an image processing program for carrying out later-described various image processing to the to-be-projected images, and image display program for controlling the video adapter 25 to generating the image data for displaying the above documents and images, etc., to the display device 27, and the image data to be output to the projector 1, etc.

In the PC 2, by the CPU 21 operating, based on the above image display program, the CPU 21 functions as the image input means, image output means, converting means, change request means and control means of the present invention.
(Structure of Digital Camera)

Figure 4:
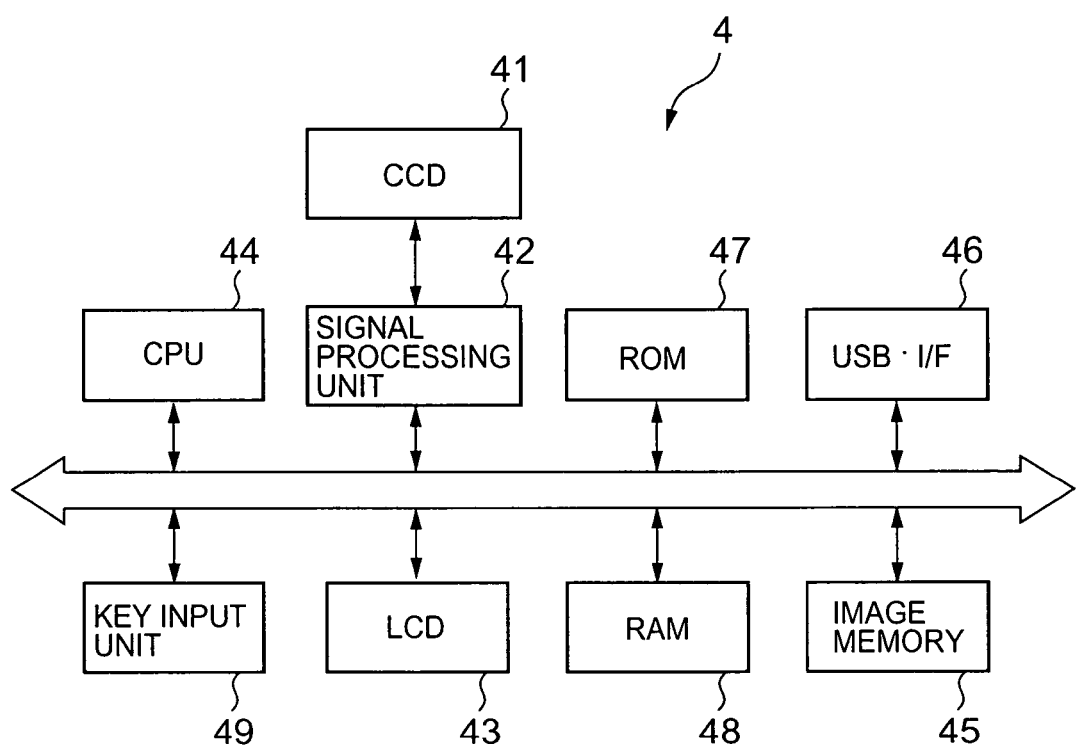
FIG. 4 is a block diagram showing an electric structure of a camera device.

FIG. 4 is a block diagram showing a structure of the digital camera 4c that serves as the camera device.

The digital camera 4c comprises a CCD 41 and a signal processing unit 42. The CCD 41 serves as the imaging means of the present invention and photographs (images) the document reference A, etc., via an un-shown lens. The signal processing unit 42 carries out various signal processing to an analog image signal output from the CCD 41 and outputs a digital image signal representing a processed image. In the present embodiment, the CCD 41 has a high resolution, for example, it has four million effective pixels.

The image signal output from the signal processing unit 42 is sent to an LCD 43 at a photographing wait state (stand-by state), to be displayed as the photographed (picked-up; imaged) subject image. At an ordinary photographing mode, the image photographed by the CCD 41 in accordance with a photographing operation is compressed by a CPU 44, following a predetermined format such as JPEG, etc., and stored to an image memory 45. On the other hand, at the predetermined photographing mode, data of the image photographed by the CCD 41 is output to the PC 2 from a USB interface 46, via the USB cable 5.

The compressed image data that is stored to the image memory 45, is read by the CPU 44, in accordance with need, and is re-displayed as a still image in the LCD 43, after being decompressed. The image memory 45 is a non-volatile memory such as a flash memory, etc., that is embedded or can be attached to/detached from the digital camera 4c. A ROM 47 that stores various control programs necessary for the CPU 44 to compress/decompress the above image data, and to control the entire device, a RAM 48 that is an operation memory of the CPU 44, and a key input unit 49 that comprises a plurality of operation keys such as a shutter key, and a mode switching key, etc., are provided to the digital camera 4c.

(Description of Operation of the Photographed Image Projection System)

An operation of projecting a document reference A, such as shown in FIG. 1 to a screen S, in the photographed image projection system structured as above, will be described.

FIG. 5 is a flowchart showing a basic operation in the present system. By the predetermined mode being set, the camera device 4 (concretely, the digital camera 4c) photographs (picks-up image, images) an arbitrary document reference A, etc., and outputs the image data of the imaged document to the PC 2 (step SA1). The PC 2 amends or modifies the photographed image by performing various image processing, such as distortion amendment processing, rotating processing, and cutting (extracting) processing, etc., on the input image data, in accordance with the image processing program. The image data after processed is output to the projector 1, by a display program (steps SA2 to SA5). Then, the projector 1 projects an image based on the image data input from the PC 2, to the screen S (step SA6).

Figure 6A:
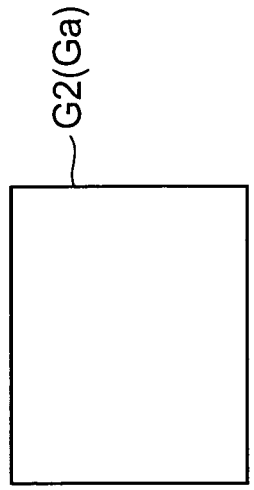
FIGS. 6A to 6D are diagrams describing the content of cutting processing by the PC.
Figure 6B:
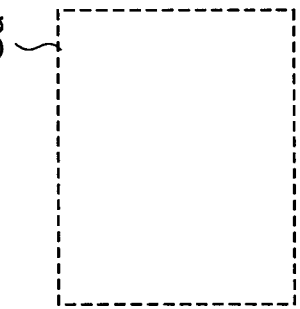
Figure 6C:
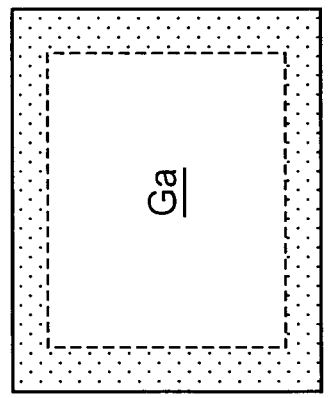
Figure 6D:
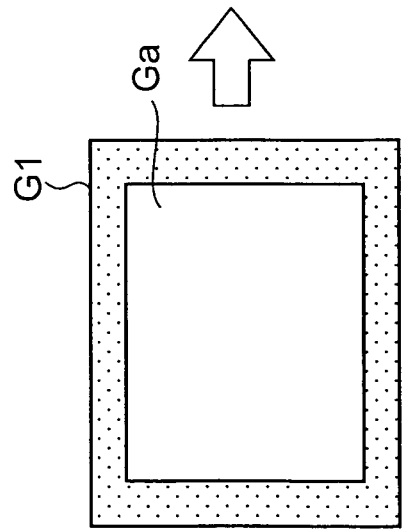

The above image processing by the PC 2 is carried out concerning a part or the entire image, in accordance with need. In the below description, it is assumed that in the above cutting processing, from an image G1 sent from the camera device (refer to FIG. 6A), for example, a designated (specified) area Ga excluding the unnecessary circumference part designated (specified) by the user, is cut (extracted) (as shown in FIGS. 6A and 6B), to output an image data of an image G2 comprising only the designated region Ga, to the projector 1.

FIG. 7 is a flowchart showing operation of the PC2 for displaying and outputting the image during the above operation. In the below, it is assumed that the resolution set at the display device 27 (hereinafter referred to as PC monitor) and the resolution of the projector 1 are the same.

Figure 8:
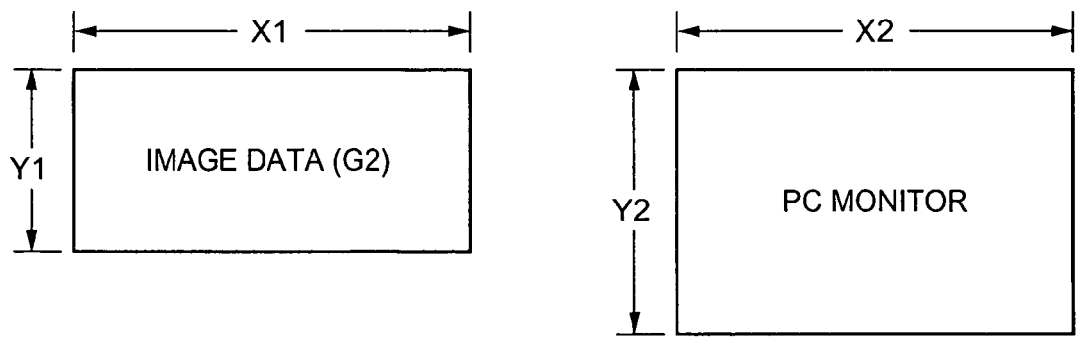
FIG. 8 is a diagram showing the lengthwise and crosswise ratio of a photographed image after the cutting processing, and the lengthwise and crosswise ratio of a PC monitor.

When displaying the image G2 that is ultimately obtained in the above image processing (hereinafter referred to as photographed image), first, the PC 2 obtains the crosswise size (pixel number) and lengthwise size (pixel number) of the image data (SB1), and calculates the ratio of the crosswise size to the lengthwise size (step SB2). Further, the PC 2 obtains the resolution set in the PC monitor (step SB3), and calculates the ratio of the crosswise size to lengthwise size thereof (step SB4). FIG. 8 is a diagram showing examples of the lengthwise and crosswise of the image data (photographed image) and display of PC 2. In FIG. 8, the ratio of crosswise size to lengthwise size of image data of image G2 is X1/Y1, and that of the PC monitor is X2/Y2. The ordinary ratio of crosswise size to lengthwise size of the PC monitor is 3/4, and if the resolution is XGA, the lengthwise and crosswise size is 768×1,024 pixels (it is the same for the projector 1).

The ratio of crosswise size to lengthwise size of the PC monitor and the ratio of crosswise to lengthwise of the image data are compared, and the longer side of the image data (image G2) with respect to the PC monitor is specified (step SB5). FIGS. 9A to 9C are diagrams showing the patterns of the specified result. The specified result becomes one of the below three results.

FIG. 9A ... (X1/Y1)>(X2/Y2), and the crosswise side (X1) is longer.

FIG. 9B ... (X1/Y1)=(X2/Y2), and the ratio of crosswise size to lengthwise size is the same as that of the PC monitor.

FIG. 9C ... (X1/Y1)<(X2/Y2), and the lengthwise side (Y1) is longer.

Next, concerning the specified longer side, from the ratio of the length of the same side of the PC monitor to that of the image G2, the magnification for enlarging or reducing the photographed image G2 is calculated (step SB6). With the calculated magnification, namely, (X2/X1) times in FIG. 9A, and (Y2/Y1) times in FIGS. 9A and 9B, the data of the photographed image G2 is reduced (step SB7). Namely, the resolution of the photographed image G2 is reduced. The reduced image (display image) G3 is displayed to the PC monitor, so that the center of the reduced image matches the center display screen of the PC monitor 27, and the image data of the above display image G3 is output to the projector 1 (step SB8). By this, the display image G3 displayed at the PC monitor 27, is displayed on the screen S. In this case, the pixel number of the images displayed on the PC monitor 27 and the pixel number of the image projected on the screen S are same.

On the other hand, FIG. 10 is a flowchart showing operation for magnifying an image that the PC 2 executes, when there is an instruction to enlarge the display image G3 from the user, by operation of operation keys or the infrared remote control unit 5, while the display image G3 is projected by the projector 1. Here, descriptions will be made assuming that the size of the photographed image G2 is 1,500×2,000 pixels (lengthwise (vertical; y) to crosswise (horizontal; x) ratio of 3:4), and the magnification rate is 1.25 times, in the x axis direction and the y axis direction respectively.

Figures 11A, 11B, 11C:
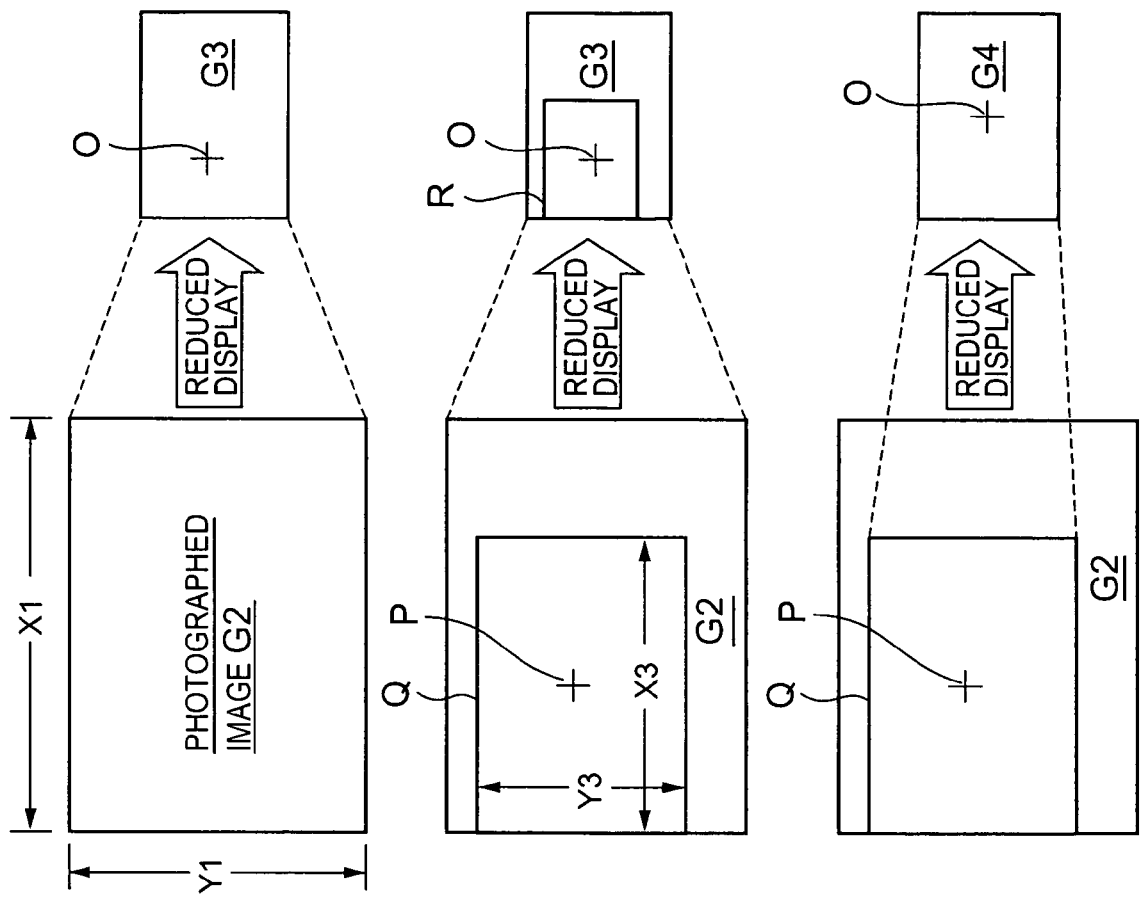
FIGS. 11A to 11C are diagrams describing the content of the magnifying processing.

In accordance with the magnification instruction from the operation keys or the infrared remote control unit 5, the PC 2 displays a cross shape point (cross cursor) that can be operated to be moved by the user using the operation keys or the infrared remote control unit 5, to the display image G3, by an OSD (On Screen Display) function, etc., and obtains a magnification position (center position of to-be-magnified area (region)) O indicated by the user by the cross shape point (step SC1: refer to FIG. 11A).

Next, the PC2 specifies the magnifying position P that corresponds to the magnifying position O of the display image G3 position homothetic with magnifying position O) in the photographed image G2 (step SC2) as shown in FIG. 11B. The positions O and P represent same points in the respective images. Then, the PC 2 sets the magnifying position P in the photographed image G2 as the center of to-be-magnified area, and specifies the display region Q which has sizes in accordance with the magnification rate designated by the user as a display region and center position corresponding to the magnifying position P. The PC 2 obtains the image data of the display region Q (step SC3: refer to FIG. 11B).

Here, because the magnification rate is 1.25 times, the lengthwise and crosswise size of the display region Q (Y3×X3) is a size (1,200×1,600 pixels) that reduced the lengthwise and crosswise size of the photographed image G2 (1,500×2,000 pixels), by 80 (1/1.25×100) percent. The display region Q is a region that is homothetic (analogous) with a region that is to be magnified in accordance with the above magnification ratio, setting the magnifying position O in the display image G3 designated by the cross-shape point, as the center.

The PC 2 performs the processing of matching the resolution of the image data of the display region Q with the resolution of the PC monitor 27, namely, the projector 1 (in the above example, reducing processing of 64 (768/1,200× 100 and 1,024/1,600×100) percent) (step SC4: refer to FIG. 11C). Then, the PC 2 displays the image based on the processed image data, namely, displays the magnified image G4 to the PC monitor 27, and projects the image to the screen S by the projector 1 (step SC5). By this, magnifying of the display image G3 is completed.

After the magnifying processing is completed, in a case where there is an instruction for scrolling (or moving) the displayed image, by the user from the operation keys or the infrared remote control unit 5, the PC 2 performs a scrolling operation. In the scrolling operation, the PC 2 moves the position of the display region Q in the photographed image G2 (or re-obtain the display region Q in the photographed image G2) (refer to FIG. 11B), in accordance with the instructed direction and moving amount and carries out the above described steps SC3 to SC5, to update the magnified image G4. Thereafter, the PC 2 repeats the above processing each time there is an instruction for scrolling (or moving). For example, if the instruction is instruction for continuous scrolling, the above operation is repeated at a predetermined interval corresponding, for example. Further, in a case where there is a reducing instruction for reducing image size by the user, from the operation keys or the infrared remote control unit 5, the PC 2 updates the display image G3 by carrying out a reducing processing of setting the region having a size which corresponds to the reducing rate designated by the user in the photographed image G2, as the display region Q (refer to FIG. 11B), in the above described step SC3.

As the above, in the photographed image projection system of the present embodiment, in a case where the resolution (the number of pixels of the image obtained by photographing or imaging) of the camera device 4 (digital camera 4c) exceeds the resolution of the projector 1 (the number of pixels that the projector 1 can projects and display), when an arbitrary area of the projection image is magnified while the photographed image is projected by the projector 1, if the magnifying rate is within a predetermined range, the magnified image that is to be projected is prepared or generated by carrying out reducing processing of the data of the photographed image G2. Therefore, degrading of image quality of the projection after magnification does not occur, and the same image quality as the image before magnifying can be ensured.

This kind of effect is not limited to a case where an image photographed by the camera device 4 is projected real-time, and for example, when an image stored in the storing device 23 of the PC 2 is projected, the same kind of effect can also be obtained in a case where the number of pixels of the stored image data, exceeds the number of pixels that the projector 1 can display.

Figure 3:
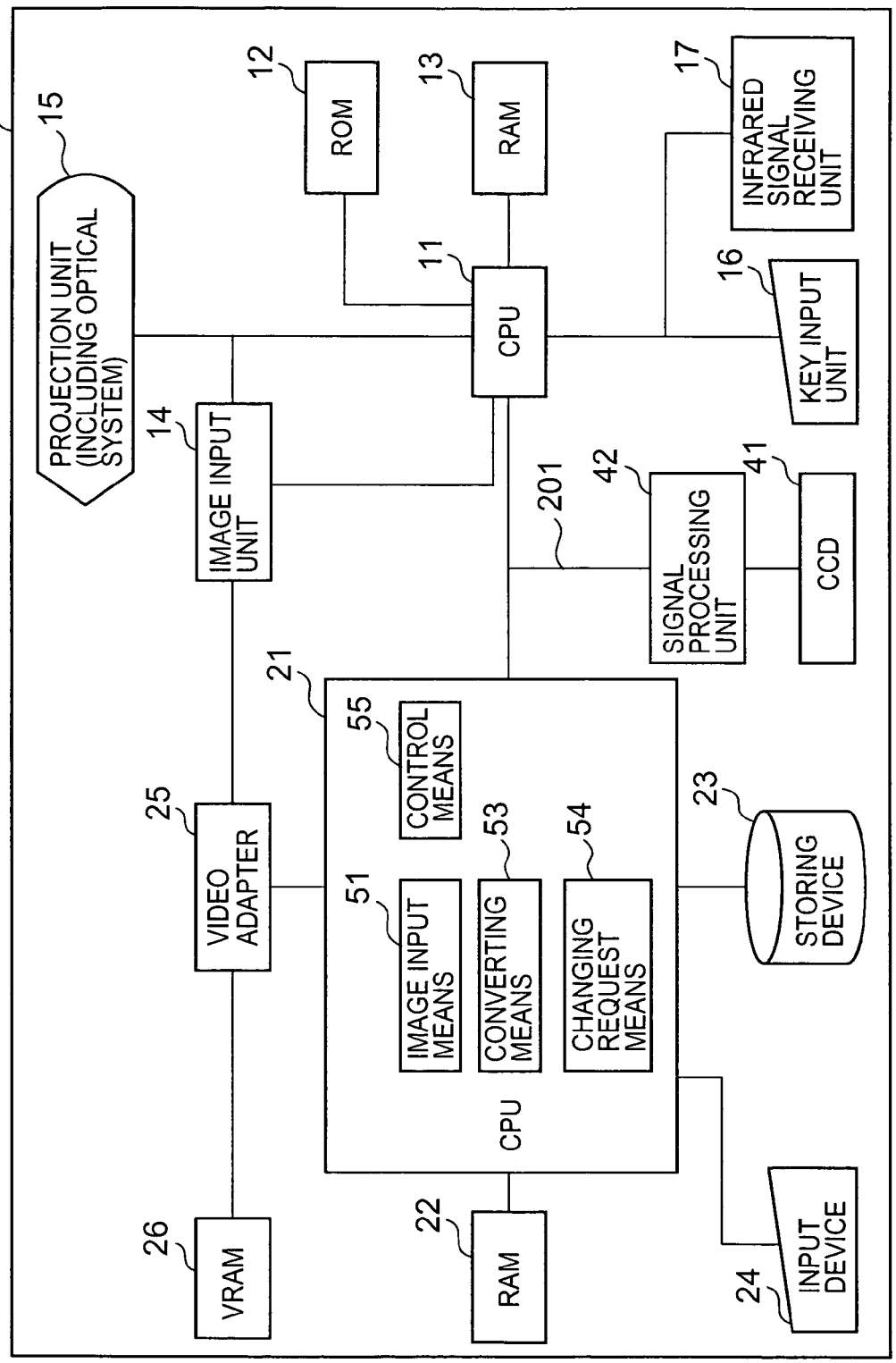
FIG. 3 is a block diagram showing the structure of a projector that has a magnifying processing function of an image embedded thereto.

The function of the above projector 1, the image magnifying processing function in the above described PC 2, and the function of the camera device can be embedded in one device. FIG. 3 is a block diagram showing the outline structure in this case. The operation of each part is substantially same as the operation in the above described photographed image projection system.

The magnifying processing of an image by the PC 2 may be carried out at the projector 1, if the CPU 11 has enough power or ability compared to those the projector 1 requires to project images. Or, output processing of the image to the projector 1 and magnifying processing of the image by performed by the PC2, can be carried out by the camera device 4, if the CPU 44 of the digital camera 4c has enough processing ability. In that case, the PC 2 may be unnecessary. In the structure where the projector 1 and the camera device 4 are connected through one USB cable with each other, instructions for magnifying the projected image etc., by the user, are carried out at the the camera device 4.

Further, in a case where the projector 1 has an imaging device such as a CCD, etc., so as to have the function as the camera device 4, the same effect as the present invention can be obtained if the photographing elements that have the number of pixels exceeding the number of pixels of the image converting elements in the display unit 15 is used, and the CPU 11 carries out the magnifying processing of the above described image, which is performed by the PC 2.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-353621 filed on Oct. 14, 2003, and including specification, claims, drawings and summary. The disclosure of the above Japanese Patent Application is incorporated herein by reference in its entirety.

What is claimed is:
1. An image projection device comprising:
receiving means for receiving original image data of an object imaged by an imaging device;
projecting means for projecting projection light on a screen;
image converting means for interpolating or reducing a resolution of the original image data so as to match a resolution of the projecting means, and for generating image data for projecting the projection light; and
magnification control means for, when (i) the image converting means generates the image data by reducing the resolution of the original image data, and then (ii) a user requests magnification of a particular region which is a part of the image data having the reduced resolution generated by the image converting means:
(a) controlling the image converting means to detect a region of the original image data that corresponds to the particular region and execute a magnification process based on the detected region of the original image data to produce magnified image data, and (b) controlling the image converting means to convert the magnified image data to the image data for projecting the projection light.

2. An image pick-up and projection system comprising:

a camera which picks-up an image of an object, and which outputs original image data representing the picked-up image;

a projecting device which converts image data to projection light to be projected on a screen;

an image generation device which generates image data to be converted by the projecting device by interpolating or reducing a resolution of the original image data so as to match a resolution of the projecting device; and a magnification control device which, when (i) the image generation device generates the image data by reducing the resolution of the original image data, and then (ii) a user requests magnification of a particular region which is a part of the image data having the reduced resolution generated by the image generation device: (a) controls the image generation device to detect a region of the original image data that corresponds to the particular region and execute a magnification process based on the detected region of the original image data to produce magnified image data, and (b) controls the projecting device to convert the magnified image data to projection light to be projected on the screen.

* * * * *